United States Patent
Bishop

(10) Patent No.: US 11,460,657 B2
(45) Date of Patent: Oct. 4, 2022

(54) FIBER MANAGEMENT SYSTEM AND METHOD FOR A TELECOMMUNICATION TERMINAL

(71) Applicant: CommScope Technologies LLC, Hickory, NC (US)

(72) Inventor: Erik David Bishop, Fuquay-Varina, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/245,548

(22) Filed: Apr. 30, 2021

(65) Prior Publication Data

US 2021/0341697 A1 Nov. 4, 2021

Related U.S. Application Data

(60) Provisional application No. 63/018,124, filed on Apr. 30, 2020.

(51) Int. Cl.
| | | |
|---|---|---|
| *G02B 6/00* | (2006.01) | |
| *G02B 6/44* | (2006.01) | |
| *G02B 6/38* | (2006.01) | |

(52) U.S. Cl.
CPC ......... *G02B 6/4452* (2013.01); *G02B 6/3825* (2013.01); *G02B 6/4454* (2013.01); *G02B 6/4457* (2013.01)

(58) Field of Classification Search
CPC .. G02B 6/4452; G02B 6/3825; G02B 6/4454; G02B 6/4457; G02B 6/4441; G02B 6/00
See application file for complete search history.

(56) References Cited

U.S. PATENT DOCUMENTS

| | | |
|---|---|---|
| 7,397,997 B2 | 7/2008 | Ferris et al. |
| 7,489,849 B2 | 2/2009 | Reagan et al. |
| 7,512,304 B2 | 3/2009 | Gronvall et al. |
| 7,653,282 B2 | 1/2010 | Blackwell, Jr. et al. |
| 7,903,923 B2 | 3/2011 | Gronvall et al. |
| 9,400,363 B2 * | 7/2016 | Coenegracht ........ H02G 15/013 |
| 10,274,686 B2 | 4/2019 | Smith et al. |

(Continued)

FOREIGN PATENT DOCUMENTS

| | | |
|---|---|---|
| WO | 2019/040742 A1 | 2/2019 |
| WO | 2019/195602 A1 | 10/2019 |
| WO | 2020/180619 A1 | 9/2020 |

(Continued)

OTHER PUBLICATIONS

U.S. Appl. No. 17/245,950, filed Apr. 30, 2021 entitled "Interlocking Fiber Optic Connector Holder".

*Primary Examiner* — Jennifer Doan
(74) *Attorney, Agent, or Firm* — Merchant & Gould P.C.

(57) ABSTRACT

A telecommunications apparatus that includes an enclosure. The enclosure includes a housing with a plurality of fiber optic adapters. The fiber optic adapters are carried within the housing and include outer ports accessible from outside the enclosure and inner ports accessible from inside the enclosure. A fiber management tray is positioned within the housing includes a fiber management spool. A plurality of optical fibers which have connectorized ends are plugged into the inner connector ports of the fiber optic adapters. The optical fibers are routed about at least one of the fiber management spools.

26 Claims, 12 Drawing Sheets

(56) References Cited

U.S. PATENT DOCUMENTS 11,092,765 B2 * 8/2021 Cams ................... G02B 6/4452
2019/0302367 A1 * 10/2019 Van Baelen ............. G02B 6/28

FOREIGN PATENT DOCUMENTS

| WO | 2020/180714 A1 | 9/2020 |
| WO | 2020/205313 A1 | 10/2020 |
| WO | 2021/026486 A1 | 2/2021 |

* cited by examiner

FIBER MANAGEMENT SYSTEM AND METHOD FOR A TELECOMMUNICATION TERMINAL

CROSS-REFERENCE TO RELATED APPLICATION

This application claims the benefit of U.S. Provisional Application No. 63/018,124, filed Apr. 30, 2020, and titled "FIBER MANAGEMENT SYSTEM AND METHOD FOR A TELECOMMUNICATION TERMINAL" the disclosure of which is hereby incorporated herein by reference.

TECHNICAL FIELD

The present disclosure relates generally to telecommunication equipment. More particularly, the present disclosure relates to telecommunication terminals.

BACKGROUND

Telecommunication systems typically employ a network of telecommunication cables capable of transmitting large volumes of data and voice signals over relatively long distances. The telecommunication cables can include fiber optic cables, electrical cables, and/or combinations of electrical and fiber optic cables. A typical telecommunication network also includes a plurality of telecommunication enclosures integrated throughout the network of telecommunication cables. The telecommunication cables are often terminated by connectors such as fiber optic connectors. The fiber optic connectors can include single-fiber fiber optic connectors and multiple-fiber fiber optic connectors. Fiber optic connectors are adapted for making de-mateable fiber optic connections between two optical fibers or between two sets of optical fibers. Fiber optic connectors are often coupled together via fiber optic adapters, but certain fiber optic connectors can be directly coupled together without the use of fiber optic adapters.

One example type of enclosure frequently used in a telecommunication system is a multi-service terminal (MST). A multi-service terminal is frequently used near the outer edge of a telecommunication network to provide optical connection points for coupling subscribers to the network via drop cables. A typical multi-service terminal includes a plurality of connector ports that are accessible from outside the terminal. Each of the connector ports is adapted for receiving a ruggedized fiber optic connector that terminates the end of a drop cable. The opposite end of the drop cable is often connected to a subscriber location to connect the subscriber location to the telecommunication network. Example multi-service terminals are disclosed by U.S. Pat. Nos. 7,653,282; 7,397,997; 7,903,923; 7,489,849; and 7,512,304 and are also disclosed by International PCT Publication Nos. WO2019/040742 and WO2019/195602.

SUMMARY

One aspect of the present disclosure relates to fiber management systems and methods for facilitating fiber routing within terminals and for facilitating assembling terminals in an efficient manner.

Another aspect of the present disclosure relates to a telecommunications apparatus including an enclosure having a housing. The telecommunications apparatus also includes a plurality of fiber optic adapters carried with the housing. The fiber optic adapters include outer connector ports accessible from outside the enclosure and inner connector ports inside the enclosure. The telecommunications apparatus further includes a fiber management tray positioned within the housing. The fiber management tray defines a length extending between first and second opposite ends. The fiber management tray includes first and second opposite sides that extend along the length of the fiber management tray between the first and second opposite ends. The fiber management tray also includes a frame defining a perimeter boundary of the fiber management tray. The perimeter boundary extends along the first and second opposite sides and around the first and second ends of the fiber management tray. The frame defines a fiber routing path that extends about the perimeter boundary. At least portions of the fiber routing path can be defined by a channel. The fiber management tray also includes fiber management spools positioned adjacent the second end of the fiber management tray. The fiber management tray further includes a primarily open region defined between the fiber management spools and the first end of the fiber management tray. Additionally, the fiber management tray includes a plurality of strips that extend between the first and second sides of the fiber management tray across the primarily open region of the fiber management tray. The telecommunications apparatus further includes a plurality of optical fibers having connectorized ends plugged into the inner connector ports of the fiber optic adapters. The optical fibers are routed on the fiber management tray and are routed about at least one of the fiber management spools.

Another aspect of the present disclosure relates to a telecommunications apparatus including an enclosure having a housing. A plurality of fiber optic adapters are carried with the housing. The fiber optic adapters include outer connector ports accessible from outside the enclosure and inner connector ports inside the enclosure. The telecommunications apparatus also includes a fiber management tray positioned within the housing. The fiber management tray includes a fiber management spool. The telecommunications apparatus further includes a plurality of optical fibers having connectorized ends plugged into the inner connector ports of the fiber optic adapters. The optical fibers each are looped an equal number of times about the fiber management spool. The optical fibers include a first optical fiber having a first routing path that extends from a start location partially around the fiber management spool to a first one of the inner ports. The optical fibers also include a second optical fiber having a second routing path that extends from the start location partially around the fiber management spool to a second one of the inner ports. The first routing path is a shortest routing path and the second routing path is a longest routing path. The optical fibers all have a length from the start location to their corresponding connectorized ends that is longer than the length of the longest routing path. In one example, all of the optical fibers have the same length from the starting point to their respective connectorized ends within manufacturing tolerances. In certain examples, the telecommunications device includes at least four, eight, or twelve fiber optic adapters and also includes connectorized optical fibers corresponding to each of the fiber optic adapters. In certain examples, a number of times the optical fibers are each looped about the spool multiplied by the difference between an outer circumference and an inner circumference of the spool is equal to or greater than a difference between the longest routing path and the shortest routing path.

Another aspect of the present disclosure relates to a method for assembling a telecommunications apparatus including an enclosure having a housing. The telecommunications apparatus also includes a plurality of fiber optic adapters carried with the housing. The telecommunications apparatus also includes a tray having a fiber management spool. The fiber optic adapters include outer connector ports accessible from outside the enclosure and inner connector ports inside the enclosure. The telecommunications enclosure further includes optical fibers routed on the tray having connectorized ends that plug into the inner connector ports of the fiber optic adapters. The optical fibers include a first optical fiber having a first fiber routing path that extends from a start location partially around the fiber management spool to a first one of the inner connector ports. The optical fibers also include a second optical fiber having a second routing path that extends from the start location partially around the fiber management spool to a second one of the inner connector ports. The first routing path is a shortest routing path and the second routing path is a longest routing path. The optical fibers all have a length from the start location to their corresponding connectorized ends that is longer than a length of the longest routing path. The method includes routing the plurality of optical fibers on the tray while the tray is outside the housing. The optical fibers are each looped an equal number of times about the fiber management spool. Excess fiber length is accommodated on the spool by loosely coiling the fibers between an inner diameter and an outer diameter of the spool. The number of times the fibers are each looped about the spool multiplied by the difference between an outer circumference and an inner circumference of the spool is equal to or greater than a difference between the longest routing path and the shortest routing path. The method also includes temporarily parking the connectorized ends of the optical fibers at staging locations on the tray. The method further includes loading the tray into the housing after routing the optical fibers on the tray and temporarily parking the connectorized ends of the optical fibers at the staging locations. After loading the tray into the housing, the connectorized ends of the optical fibers are removed from the staging locations and plugged into their corresponding inner connector ports. Fiber length for accommodating moving the connectorized ends of the optical fibers to the inner connector ports is provided by tightening the coils of the fiber loops about the spool. In certain examples, all of the optical fibers have the same length from the starting point to their respective connectorized ends, within manufacturing tolerances. In certain examples, the fiber length for accommodating moving the connectorized ends of the optical fibers from the staging location to the inner connector ports is provided without requiring any optical fiber to be uncoiled from the spool, instead the fiber length is provided by tightening of the fiber coils on the spool.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

A multi-service terminal (MST) is an enclosure that is commonly installed near the outer edge of a fiber optic network to provide optical connection locations for connecting subscribers to the fiber optic network. A typical MST is an enclosure having a plurality of hardened fiber optic adapter ports that are accessible from outside the enclosure. The hardened fiber optic adapter ports are adapted to receive hardened fiber optic connectors terminating the ends of drop cables. A drop cable is typically routed from a port of an MST to a subscriber location. For example, the drop cable can be routed from the MST to an ONT at the subscriber location such that service is provided to the ONT via an optical line coupled to the fiber optic network.

Figure 1:
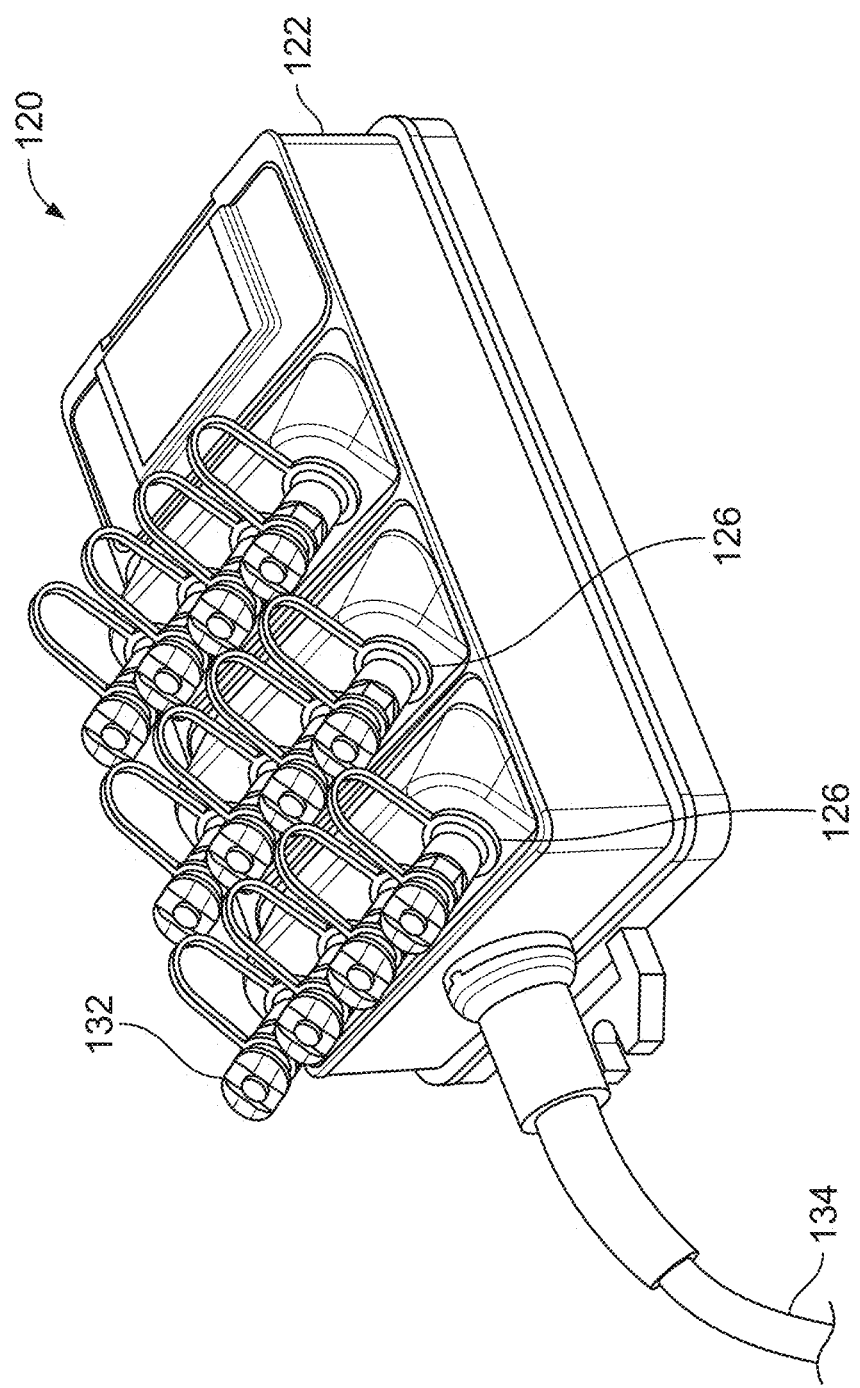
FIG. 1 depicts an example enclosure (e.g., terminal) with respect to which fiber management systems and methods in accordance with the principles of the present disclosure can be utilized.
Figure 4:
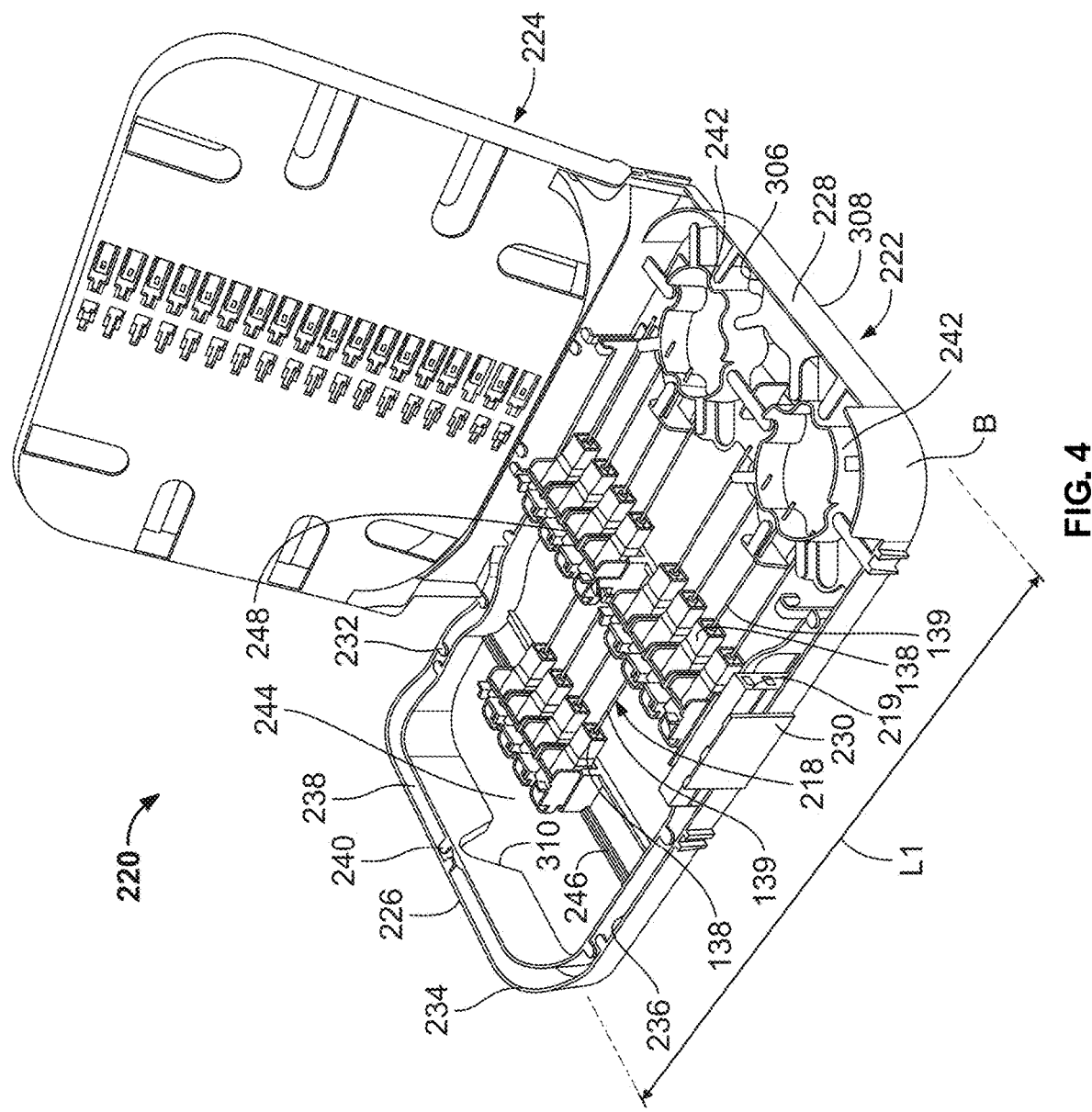
FIG. 4 is a perspective view depicting the tray arrangement of FIG. 2 with a top tray of the assembly pivoted to an open position.
Figure 9:
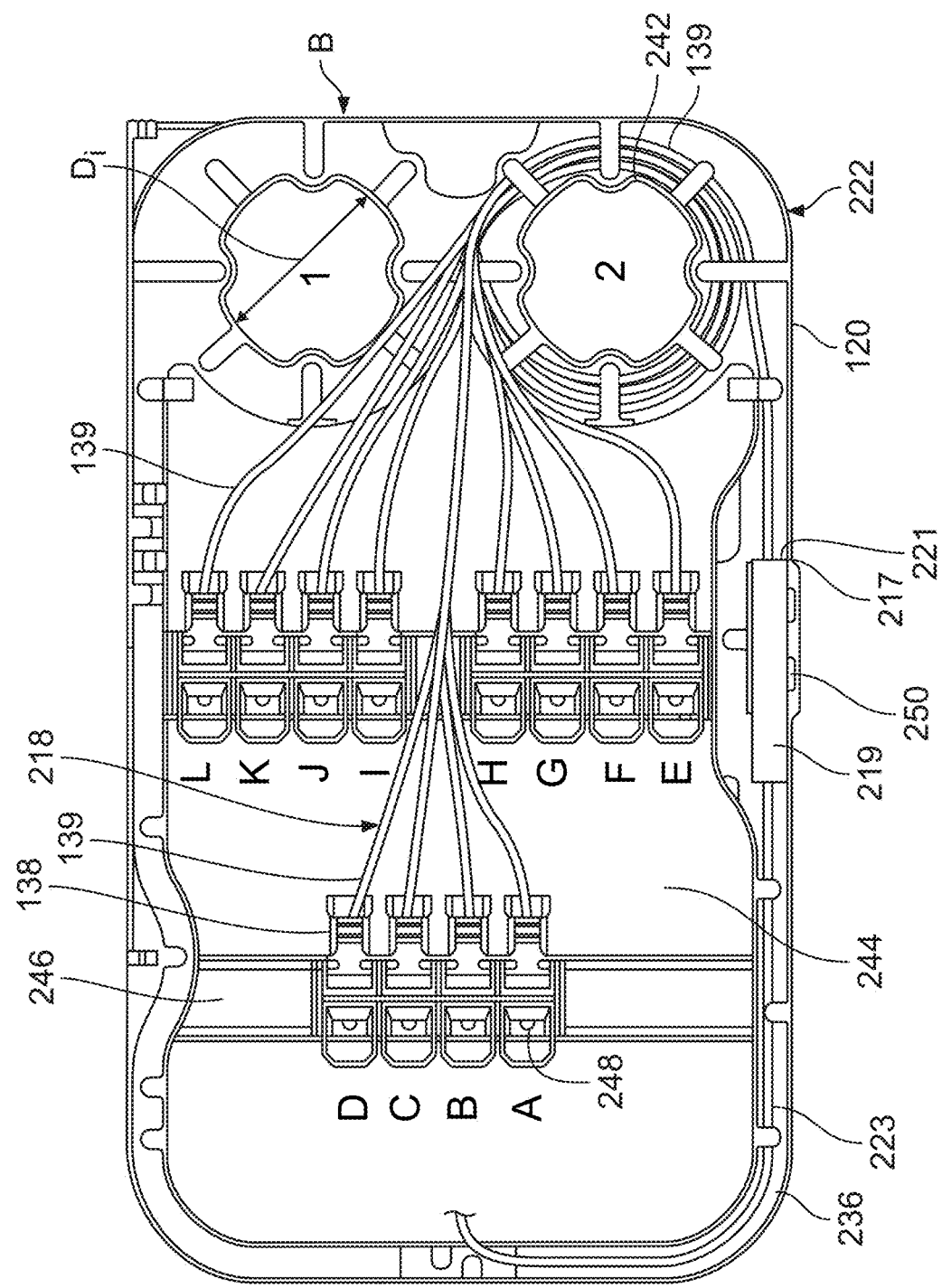
FIG. 9 depicts the tray arrangement and housing cover of FIGS. 5 and 6 including an overlay showing outputs of the optical component pre-routed on the tray with connectorized ends of the optical fibers temporarily parked at staging locations on the tray.

FIG. 1 depicts an example MST 120. The MST 120 includes a housing 122 that is preferably environmentally sealed. A plurality of hardened fiber optic adapters 126 (see FIG. 2) are carried with the housing 122. Each of the hardened fiber optic adapters 126 includes a hardened outer port 128 accessible from outside the housing 122, and a non-hardened inner port 130 accessible from inside the interior of the housing 122. In some examples, the hardened outer ports 128 can be unitarily integrated in a wall of the housing 122, but in the depicted example the hardened outer ports 128 are defined by separate adapter parts mounted within openings defined by the housing 122. The hardened outer ports 128 can be closed by exterior plugs 132 (see FIG. 1) when not in use. A fiber optic cable 134 is routed into the interior of the housing 122. The fiber optic cable 134 can include one or more optical fibers (e.g., see input optical fiber 216 depicted in FIG. 5). The input optical fiber or fibers from the cable can be coupled to non-hardened fiber optic connectors (e.g., connectors such as LC connectors, SC connectors, or more simplified connectors that in one of their simplest forms may include just a ferrule). The input fiber(s) can be coupled to the non-hardened connectors either directly (e.g., direct termination of the connectors on the optical fibers) or by optically coupling (e.g., optically splicing) the input fiber(s) to connectorized optical pigtails or to the input sides of optical components (e.g., passive optical power splitters, optical taps, wavelength division multiplexers or the like) having outputs optically coupled to connectorized optical pigtails. Example non-hardened fiber optic connectors 138 are depicted at FIGS. 4 and 9. The non-hardened fiber optic connectors 138 terminate the ends of optical fibers 139 to form connectorized pigtails 218. The connectorized pigtails 218 are depicted routed to the inner ports 130 of the fiber optic adapters 126 at FIG. 10, wherein the non-hardened fiber optic connectors 138 plug into the inner ports 130. The connectorized pigtails 218 have ends 221 (see FIGS. 9 and 10) opposite the ends connectorized by the non-hardened fiber optic connectors 138. The ends 221 are depicted coupled to the output side 217 of an optical component 219 (e.g., a passive optical power splitter, an optical tap, a wavelength division multiplexer or the like). An input optical fiber 223 of the optical component 219 is depicted optically coupled (e.g., fusion or mechanically spliced) to the input optical fiber 216 (see FIGS. 5 and 6).

Figure 2:
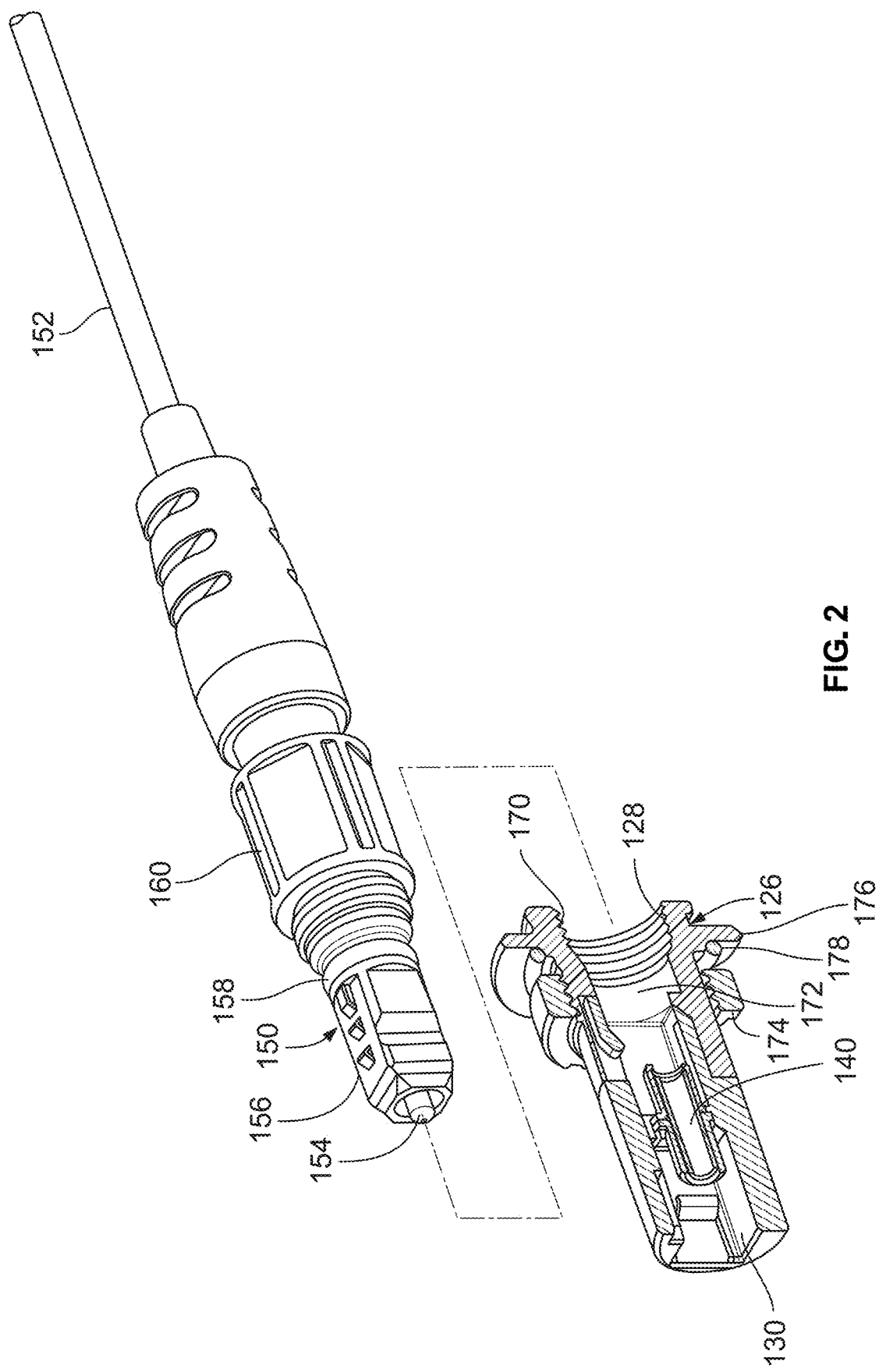
FIG. 2 depicts an example hardened fiber optic adapter suitable for use with example enclosures in accordance with the principles of the present disclosure, a hardened fiber optic connector adapted to mate with a corresponding hardened outer port of the hardened fiber optic adapter is also depicted.

As shown at FIG. 2, each of the hardened fiber optic adapters 126 includes a ferrule alignment sleeve 140 for receiving and aligning the ferrules of two fiber optic connectors desired to be coupled together. It will be appreciated that the ferrules support the ends of optical fibers that are coaxially aligned when the ferrules of the connectors are aligned within the ferrule alignment sleeve 140. An example MST is described in U.S. Pat. No. 7,512,304, which is hereby incorporated by reference in its entirety.

FIG. 2 also depicts an example hardened fiber optic connector 150 adapted to mate with one of the hardened outer ports 128 of the MST 120. The hardened fiber optic connector 150 is depicted coupled to a drop cable 152. The hardened fiber optic connector 150 includes a ferrule 154 for supporting the end of an optical fiber of the drop cable 152. The ferrule 154 is mounted at the end of a connector body 156 adapted to be received within one of the hardened outer ports 128 of the hardened fiber optic adapters 126. In certain examples, the hardened fiber optic connector 150 includes an environmental seal 158 and a turn-to-secure fastener 160. In the depicted example, the turn-to-secure fastener 160 includes threads, but alternatively could include a bayonet connection interface or another interface that interlocks by a turning action. The hardened outer port 128 includes internal threads 170 and a sealing surface 172. Further details of the hardened fiber optic connector 150 are provided in U.S. Pat. No. 7,744,288, which is hereby incorporated by reference in its entirety.

When the hardened fiber optic connector 150 is installed in the hardened outer port 128 of the fiber optic adapter 126, the ferrule 154 is received within the ferrule alignment sleeve 140, the environmental seal 158 seals against the sealing surface 172, and external threads of the turn-to-secure fastener 160 engage with the internal threads 170 of the fiber optic adapter 126 to retain the hardened fiber optic connector 150 within the hardened outer port 128. In certain examples, the fiber optic adapter 126 can be secured within an opening of an enclosure by a nut 174 with a wall of the enclosure being captured between the nut 174 and a flange 176. An environmental seal 178 can provide sealing between the flange 176 and the enclosure wall.

It will be appreciated that the MST 120 can be readily used to interconnect subscribers to a fiber optic network. Each of the hardened fiber optic adapters 126 represents a connection port for coupling a subscriber to the network. To connect a subscriber to the network, the exterior plug 132 of one of the hardened fiber optic adapters 126 is removed to expose the hardened outer port 128. A fiber optic drop cable 152 connectorized by a hardened fiber optic connection is then coupled to the network by inserting the hardened fiber optic connector 150 into the hardened outer port 128. Upon installation of the hardened fiber optic connector 150 in the hardened outer port 128, a fiber of the drop cable is optically connected to a corresponding optical fiber of the fiber optic cable 134. For example, the hardened fiber optic connector 150 installed within the hardened outer port 128 connects with the corresponding non-hardened fiber optic connector 138 installed within the inner port 130 of the hardened fiber optic adapter to couple the drop line to the network.

Aspects of the present disclosure relate to fiber management systems for managing optical fibers in telecommunication enclosures and for facilitating assembly of telecommunication enclosures. In certain examples, the fiber management system can include one or more fiber management trays. In certain examples, the one or more fiber management trays can include one or more spools. In certain examples, optical fibers can be pre-routed on the tray or trays prior to assembly of the tray or trays within a telecommunication enclosure. In certain examples, the optical fibers can have connectorized ends that are staged (temporarily stored, parked, held or the like) at a staging location or locations on the tray or trays prior to mounting the tray or trays within the telecommunication enclosure. In certain examples, once the tray or trays are mounted within the telecommunication enclosure, the pre-connectorized ends of the optical fibers can be moved from the staging location or locations and inserted within ports of fiber optic adapters carried with the telecommunication enclosure. In certain examples, excess fiber length for moving the optical fibers from the staging location or locations to the fiber optic adapters can be managed on a spool of the tray. In certain examples, the excess fiber length can be temporarily stored on the spool by loosely coiling the optical fibers about the spool so that excess fiber length is stored between an inner circumference and an outer circumference of the spool. In certain examples, when the connectorized ends of the optical fibers are moved from the staging location or locations to the connector ports, excess fiber length for accommodating movement of the connectors is provided by tightening the coils of the optical fibers on the spool without requiring the optical fibers to be uncoiled from the spool. In certain examples, the optical fibers within the enclosure routed to the fiber optic adapters all have the same length within manufacturing tolerances. In certain examples, the optical fibers are required to be routed along routing paths having different lengths, and the number of times the optical fibers are each looped about the spool, multiplied by the difference between an outer circumference and an inner circumferences of the spool, is greater than a difference between the longest routing path and the shortest routing path.

Figure 3:
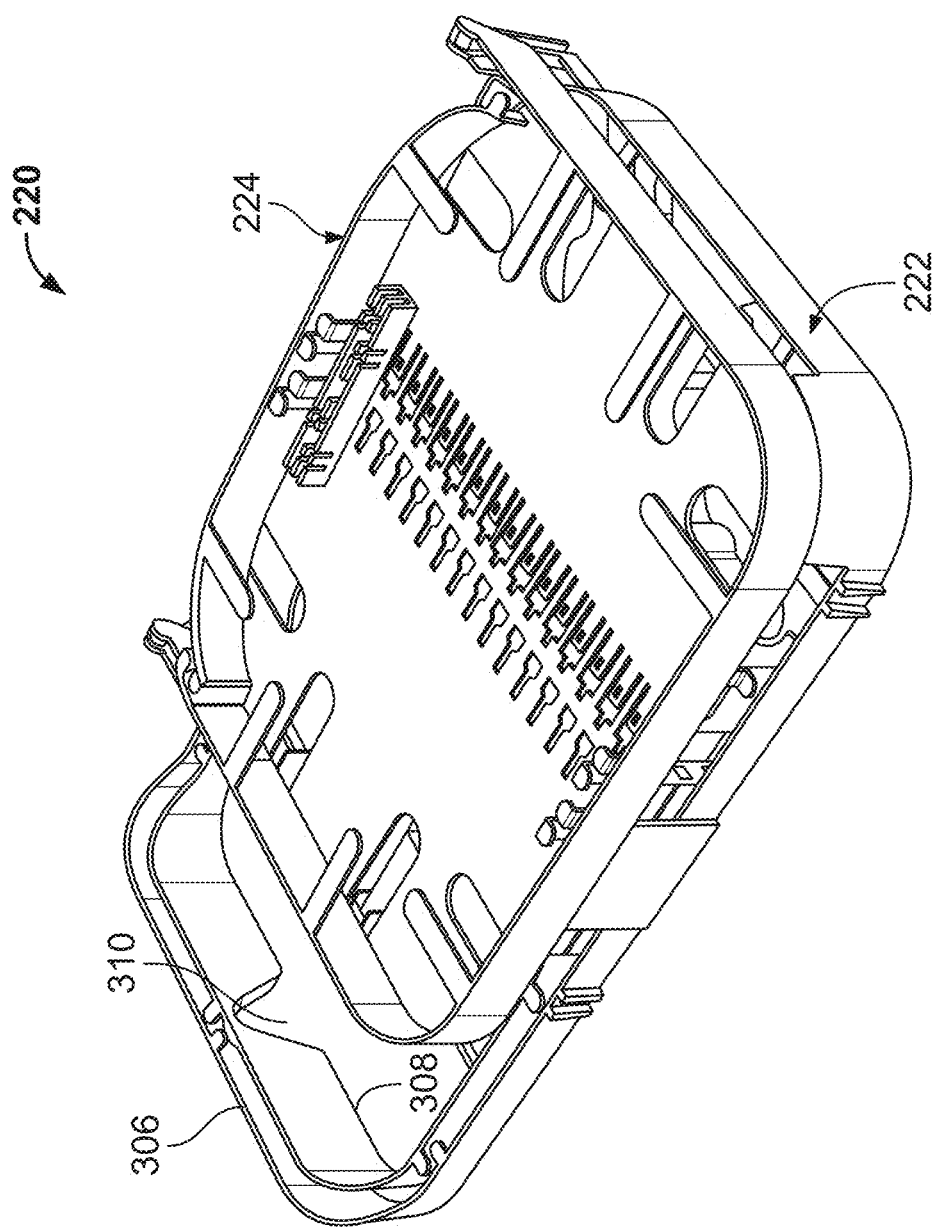
FIG. 3 is a perspective view depicting a fiber management tray assembly in accordance with the principles of the present disclosure, the tray assembly can be used to manage optical fibers within the enclosure of FIG. 1.

FIGS. 3 and 4 depict a fiber management system including a tray assembly 220 that can be used for managing optical fibers within a telecommunication enclosure such as the MST 120. In certain examples, the tray assembly 220 allows optical fibers to be pre-routed prior to installation of the tray assembly 220 in the MST 120. The tray assembly 220 includes first and second trays depicted as a bottom tray 222 and a top tray 224 adapted to be positioned over the bottom tray 222. In one non-limiting example, the bottom and top trays 222, 224 are pivotally connected together at a hinge. FIG. 3 shows the tray assembly 220 pivoted to a closed position in which the top tray 224 is stacked directly over the bottom tray 222 and FIG. 4 shows the tray assembly 220 pivoted to an open position in which the top tray 224 is pivoted upwardly relative to the bottom tray 222 so as to allow for access to the bottom tray 222.

In the depicted example, the top tray 224 has a smaller perimeter form factor as compared to the bottom tray 222, but in other embodiments the top and bottom trays 222, 224 can have the same perimeter form factors. In certain examples, the top tray 224 can define locations for mounting optical components such as optical splices. For example, splice protectors for protecting optical splices between individual optical fibers or between sets of optical fibers (e.g., optical fiber ribbons, mass fusion splices, etc.) can be mounted at splice holder locations provided on the top tray 224. Additionally, optical components such as wavelength division multiplexers, passive optical power splitters, optical taps and fiber optic fan-out devices can be mounted on the top tray 224.

In certain examples, the bottom tray 222 can be configured for managing optical fibers intended to be routed to the non-hardened inner ports 130 of the MST 120, and for temporarily staging the non-hardened fiber optic connectors 138 which are mounted at the ends of the optical fibers (see FIG. 4 where the non-hardened fiber optic connectors 138 are mounted at staging locations on the bottom tray 222). It will be appreciated that the bottom and top trays 222, 224 can each be referred to generally as a fiber management tray. The staging locations can include connector holders that are capable of holding fiber optic connectors with dust caps mounted over the ferrules of the fiber optic connectors.

Referring to FIG. 4, the bottom tray 222 defines a length L1 that extends between first and second opposite ends 226, 228 of the bottom tray 222. The bottom tray 222 also includes first and second opposite sides 230, 232, that extend along the length L1 of the bottom tray 222 between the first and second opposite ends 226, 228. The bottom tray 222 further includes a frame 234 which defines a perimeter boundary B of the bottom tray 222. The perimeter boundary B extends along the first and second opposite sides, 230, 232 and around the first and second ends 226, 228 of the bottom tray 222. The frame 234 defines a fiber routing path 236 that extends at least partially the perimeter boundary B. In certain examples, the fiber routing path 236 can extend completely around the perimeter boundary B. In certain examples, the frame 234 can include channels 238 which extend along at least a portion of the fiber routing path 236. As depicted, a channel 238 extends about the first end 226 of the bottom tray 222 and along a majority of the lengths of the first and second sides 230, 232 of the bottom tray 222.

Tabs 240 can extend over the channel 238 for facilitating retaining optical fibers in the tray within the fiber routing path 236.

Referring again to FIG. 4, the bottom tray 222 preferably includes at least one fiber management spool 242 positioned adjacent the second end 228 of the bottom tray 222. As depicted, the bottom tray 222 includes two of the fiber management spools 242 positioned adjacent the second end 228 of the bottom tray 222. The bottom tray 222 also includes a primarily open region 244 defined between the fiber management spools 242 and the first end 226 of the bottom tray 222. The bottom tray 222 also includes a plurality of strips 246 that extend across the primarily open region 244 between the first and second sides 230, 232 of the bottom tray 222. The strips 246 provide mounting locations for attaching connector holders 248 to the bottom tray 222. The connector holders 248 can attach to the strips 246 by detachable connection arrangements such as snap-fit connection arrangements. The connector holders 248 can be configured for receiving and holding the non-hardened fiber optic connectors 138 of the connectorized pigtails 218 at a staging location (e.g., a storage location) on the bottom tray 222. In certain examples, the connector holders 248 temporarily hold the non-hardened fiber optic connectors 138 at the staging location on the bottom tray 222 until it is desired to plug the non-hardened fiber optic connectors 138 into the inner ports 130 of their corresponding fiber optic adapters 126. It will be appreciated that the connector holders 248 can hold the non-hardened fiber optic connectors 138 by means such as a snap fit connection or a press-fit connection that allows the non-hardened fiber optic connectors 138 to be readily inserted into and removed from the connector holders 248. It will also be appreciated that the connector holders 248 can be removed from the strips 246 of the bottom tray 222 after the non-hardened fiber optic connectors 138 have been installed in their corresponding fiber optic adapters 126.

Figure 10:
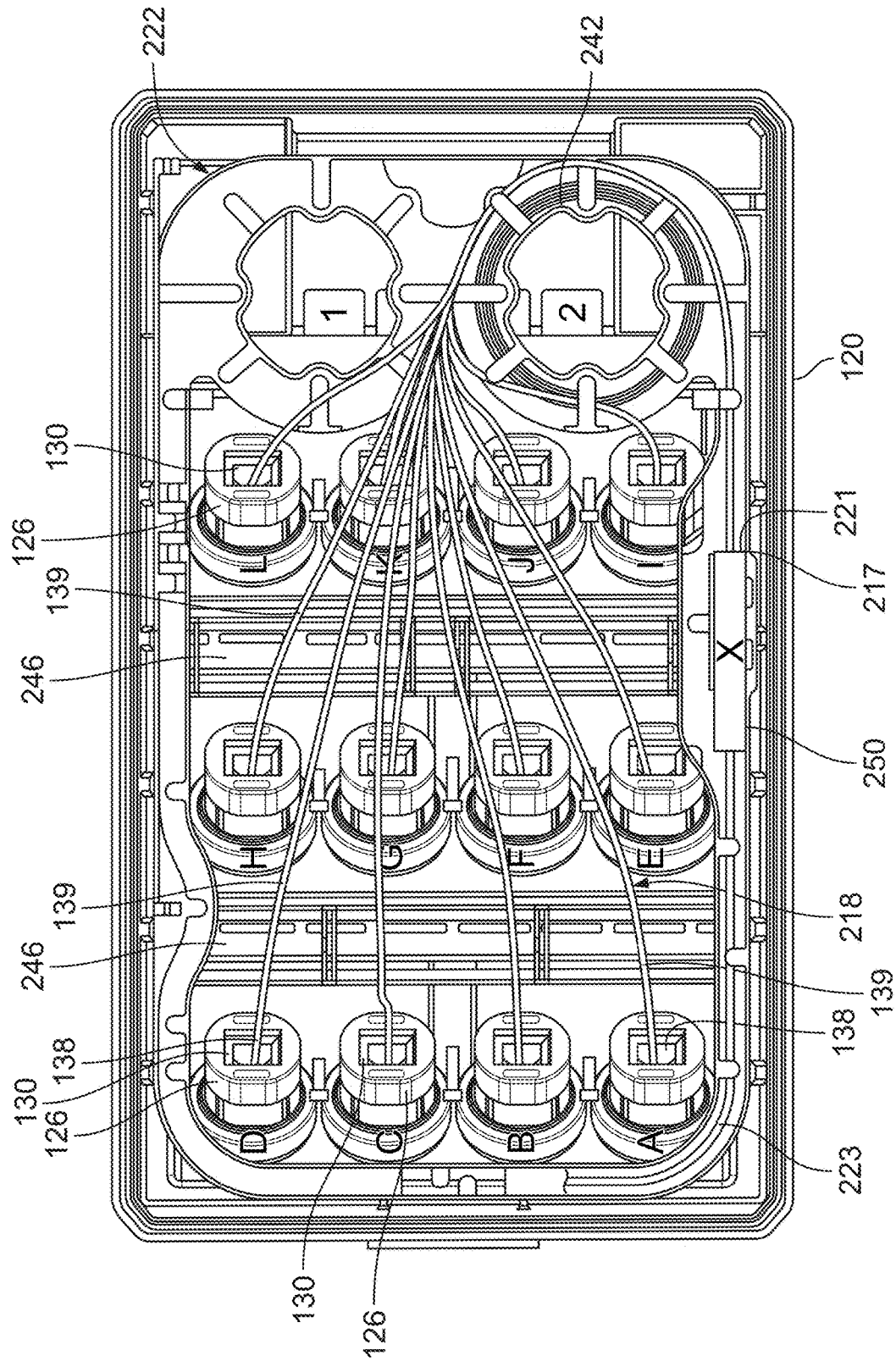
FIG. 10 depicts the housing cover and tray arrangement of FIGS. 5-7 with an overlay showing the output fibers of the optical component in a final configuration in which the connectorized ends of the optical fibers have been removed from the temporary parking locations to their corresponding connector ports.

As indicated previously, the tray assembly 220 is preferably adapted for managing optical fibers such as optical fibers utilized with an enclosure such as the MST 120. As depicted at FIGS. 9 and 10, the optical fibers 139 of the connectorized pigtails 218 are shown routed about (e.g., looped or coiled about) at least one of the fiber management spools 242. As shown at FIGS. 9 and 10, all of the optical fibers 139 are routed about only one of the fiber management spools 242. As shown at FIGS. 9 and 10, the optical component 219 is mounted on the bottom tray 222. For example, the optical component 219 is shown mounted at a component mounting location 250 positioned along the fiber routing path 236.

Figure 5:
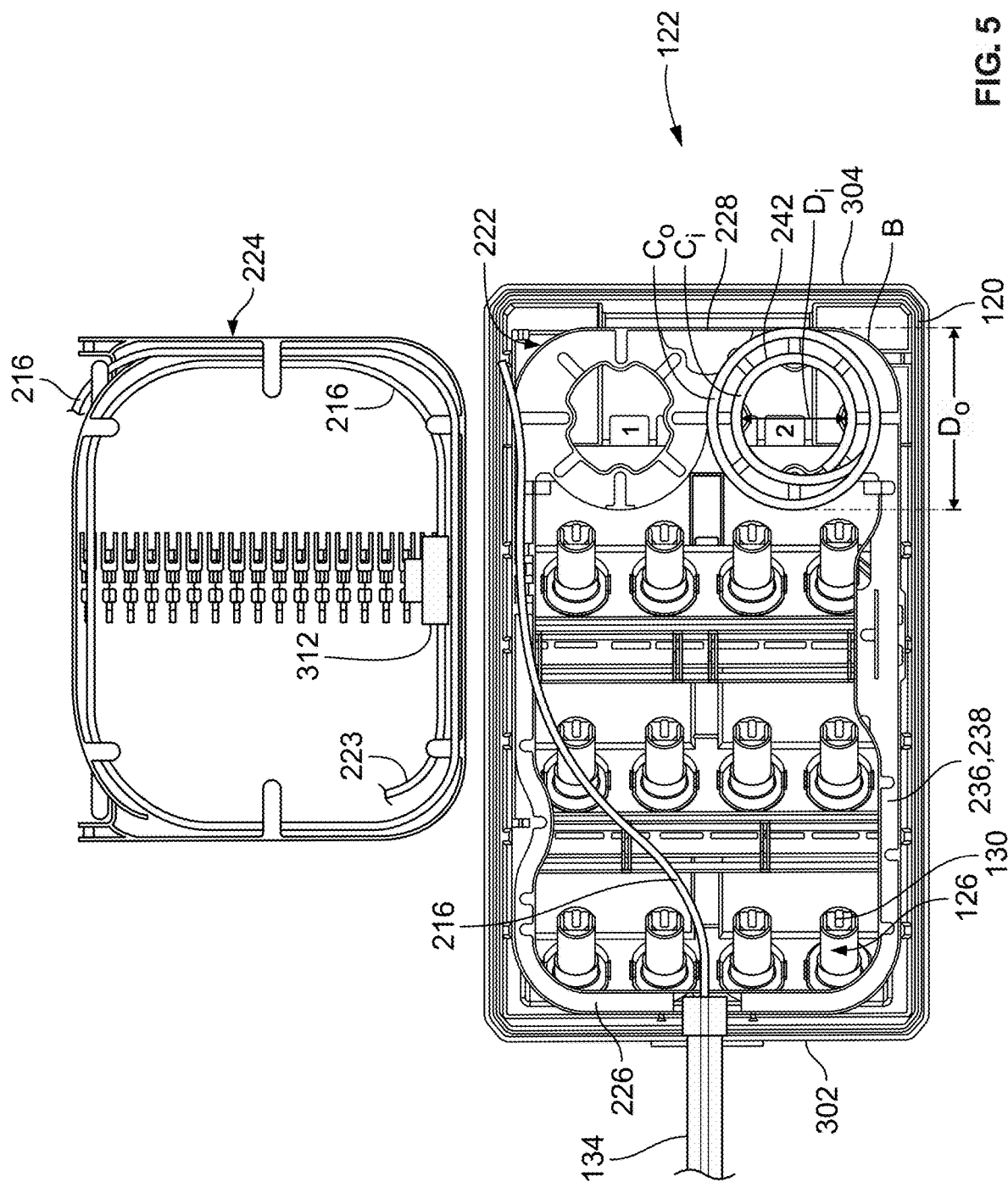
FIG. 5 depicts the tray assembly of FIG. 2 loaded within a cover of a housing of the enclosure of FIG. 1, a routing path for routing an optical fiber from an input cable is also depicted.
Figure 6:
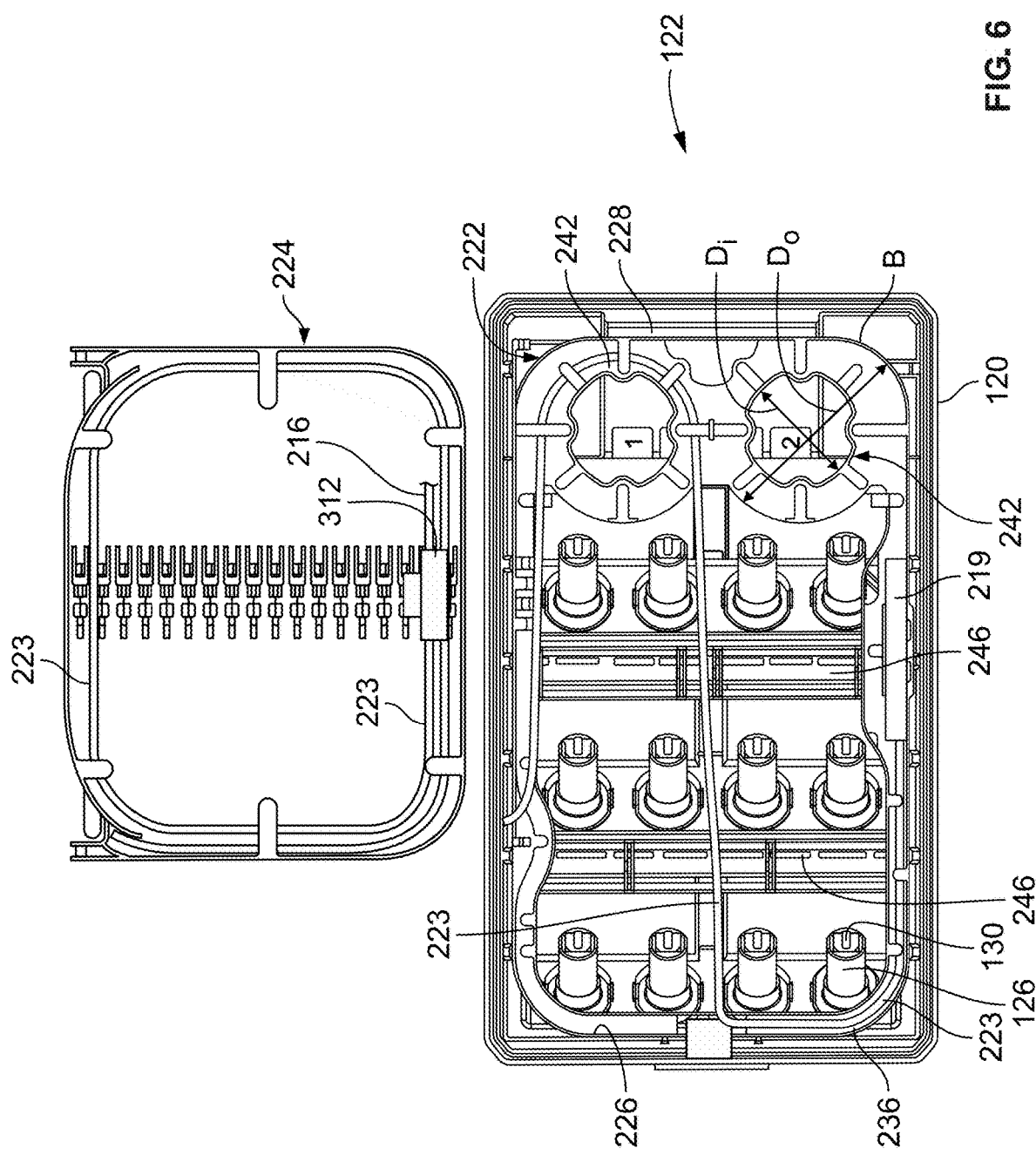
FIG. 6 depicts the tray arrangement and housing cover of FIG. 5 with an overlay showing an example routing path of an input fiber routed to an input side of an optical component such as a passive optical splitter or wavelength division multiplexer.
Figure 7:
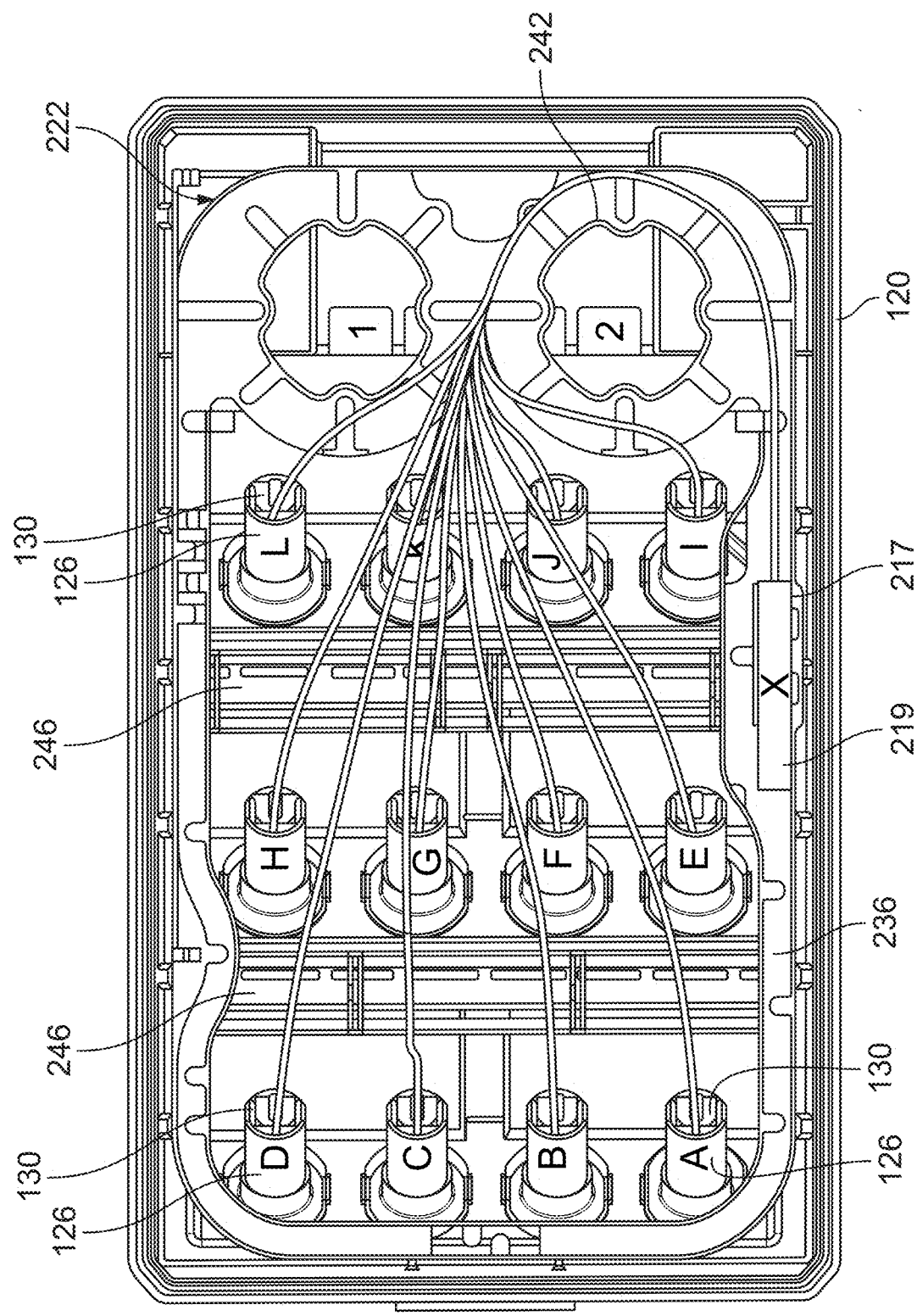
FIG. 7 depicts the tray arrangement and housing cover of FIGS. 5 and 6 with an overlay showing example routing paths corresponding to output fibers routed from the optical component to inner connector ports of fiber optic adapters carried by the cover of the housing.

Referring to FIGS. 5 and 6, the housing 122 of the MST 120 has a first end 302 and an opposite second end 304. The tray assembly 220 mounts in the housing 122 with the first end 226 of the bottom tray 222 adjacent to the first end 302 of the housing 122 and the second end 228 of the bottom tray 222 adjacent to the second end 304 of the housing 122. The fiber optic cable 134 enters the MST 120 through the first end 302 of the housing 122. Thus, the input optical fiber 216 of the fiber optic cable 134 enters the housing 122 through the first end 302 of the housing 122. The bottom tray 222 includes a top side 306 and a bottom side 308. The frame 234 of the bottom tray 222 defines a notch 310 at the bottom side 308 of the bottom tray 222 adjacent the first end 226 of the bottom tray 222. With the tray assembly 220 mounted within the housing 122, the notch 310 is positioned at the first end 302 of the housing 122 at a central location adapted for allowing the input optical fiber 216 of the fiber optic cable 134 to be routed through the notch 310 and onto the tray assembly 220. As shown at FIG. 5, the input optical fiber 216 is routed from the notch 310 across the bottom tray 222 to the hinge location where the bottom and top trays 222, 224 are pivotally connected together. At the hinge location, the input optical fiber is routed from the bottom tray 222 to the top tray 224.

The top tray 224 is adapted for managing optical fiber and for holding optical components such as optical splices. In the depicted example of FIGS. 5 and 6, the excess fiber of the input optical fiber 216 is stored at the top tray 224 by routing the input optical fiber 216 about a perimeter of the top tray 224. Also, the input optical fiber 216 is optically coupled to the input optical fiber 223 of the optical component 219 at a splice location 312 provided at the top tray 224. In certain examples, the splice location can include a splice protector such as a shrink-fit sleeve including one or more metal reinforcing rods that is used to reinforce an optical fusion splice between the input optical fiber 216 of the fiber optic cable 134 and the input optical fiber 223 of the optical component 219. As shown at FIG. 6, the input optical fiber 223 of the optical component 219 is routed from the splice location 312 about the perimeter of the top tray 224 to store excess fiber length and then is routed at the hinge location from the top tray 224 to the bottom tray 222. At the bottom tray 222, the input optical fiber 223 of the optical component 219 is routed about the fiber management spool 242 closest to the hinge location and then is routed to an input side of the optical component 219. The optical component 219, in certain examples, can include a passive optical power splitter or a wavelength division multiplexer that optically couples the input optical fiber 216 to the connectorized pigtails 218. In other examples, the fiber optic cable 134 can include a plurality of optical fibers that can be ribbonized or loose, and that can be routed to the input side of the optical component 219. In such examples, the optical component 219 can include a fan out for fanning out the plurality of input optical fibers to a plurality of connectorized pigtails.

Referring to FIG. 10, the connectorized pigtails 218 are routed from the output side 217 of the optical component 219 around the fiber management spool 242 farthest from the hinge location between the top and bottom trays 224, 222 and then are routed to the inner ports 130 of each of their corresponding fiber optic adapters 126. The optical fibers 139 of the connectorized pigtails 218 are preferably looped or coiled a plurality of times about the fiber management spool 242. In certain examples, the optical fibers 139 are each coiled the same number of times about the fiber management spool 242 and have the same length within manufacturing tolerances (e.g., within six centimeters). In certain examples, each of the optical fibers 139 of the connectorized pigtails 218 is wrapped at least two, three, four, five, six or more times around the fiber management spool 242.

In the depicted example, the MST 120 includes 12 of the fiber optic adapters 126. In other examples, the MST 120 can include at least two, at least four, at least eight or at least 12 of the fiber optic adapters 126.

Figure 11:
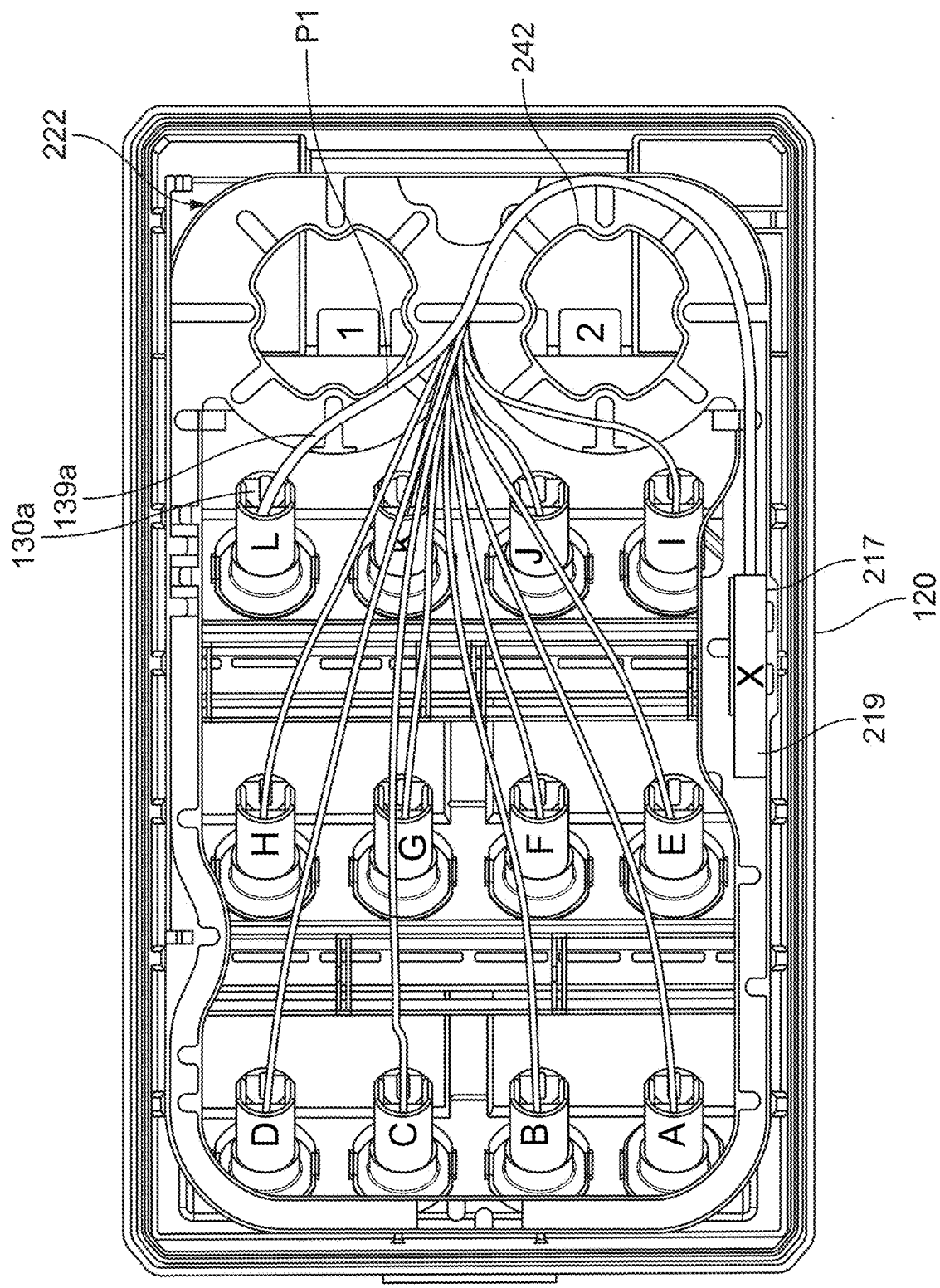
FIG. 11 shows the tray arrangement of FIG. 7 with a shortest routing path highlighted.
Figure 12:
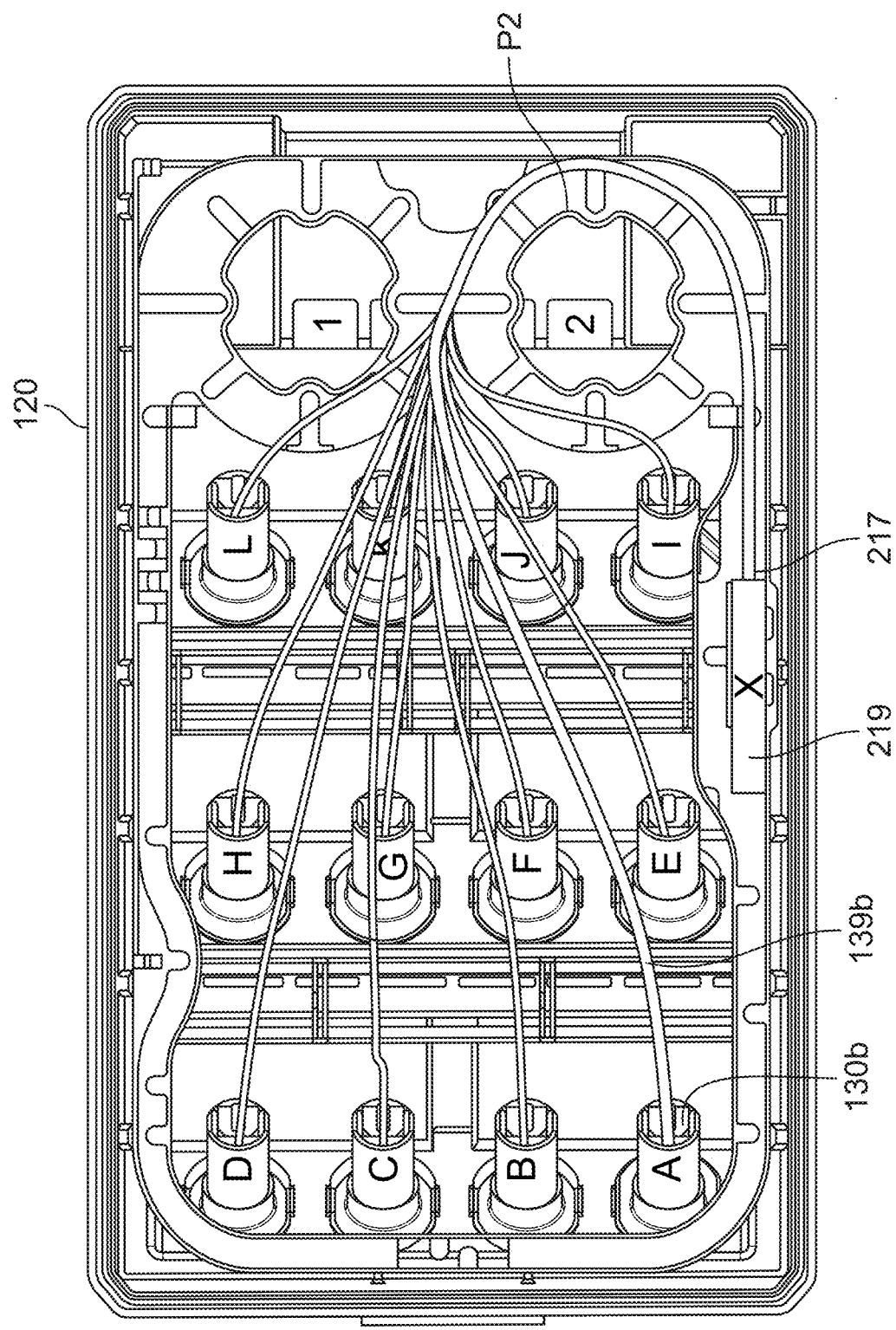
FIG. 12 shows the tray arrangement of FIG. 7 with a longest routing path highlighted.

Referring to FIG. 10, the non-hardened fiber optic connectors 138 at the ends of the connectorized pigtails 218 are plugged into the inner ports 130 of the fiber optic adapters 126. The optical fibers 139 of the connectorized pigtails 218 are each looped an equal number of times about the fiber management spool 242. Preferably, the number of times each of the fibers is looped about the fiber management spool 242 is equal to or greater than at least two, three, four or five times. It will be appreciated that the connectorized pigtails 218 can all start at the same location (e.g., the output side 217 of the optical component 219) and are routed to the inner ports 130 of the fiber optic adapters 126 which are at different locations from one another. Thus, it will be appreciated that the fiber routing paths of at least some of the connectorized pigtails 218 have different lengths. In determining the routing lengths, the excess length of optical fiber stored on the fiber management spool 242 by coiling the fiber about the spool 242 is not included. For example, as shown at FIG. 11, the optical fibers 139 include a first optical fiber 139a having a first routing path P1 that extends from a start location (e.g., the output side 217 of the optical component 219) partially around the fiber management spool 242 to a first one of the inner connector ports 130a. The optical fibers 139 also include a second optical fiber 139b having a second routing path P2 (see FIG. 12) that extends from the start location partially around the fiber management spool 242 to a second one of the inner connector ports 130b. It will be appreciated that the first routing path P1 is a shortest routing path of all the routing paths, and the second routing path P2 is a longest routing path of all the routing paths. It is preferred for all the optical fibers 139 to have an actual length (including the lengths of the portions of the fibers coiled on the spool) from the start location to their corresponding connectorized ends that is longer than a length of the longest routing path P2. In a preferred example, all of the optical fibers 139 have the same actual length from the starting point to their respective connectorized ends within manufacturing tolerances. It will be appreciated that the actual lengths of the optical fibers their starting points to their respective connectorized ends includes the excess fiber length corresponding to the coils of optical fiber about the fiber management spool 242. In a preferred example, a number of times the optical fibers are each looped about the spool 242 multiplied by the difference between an outer circumference and an inner circumference of the spool is equal to or greater than a difference between the longest routing path P2 and the shortest routing path P1.

Aspects of the present disclosure also relate to a method for assembling a telecommunications apparatus including an enclosure such as the housing 122 of the MST 120. The method can include routing the plurality of optical fibers 139 of the connectorized pigtails 218 on the bottom tray 222 while the bottom tray 222 is outside the housing 122. The optical fibers 139 are each looped an equal number of times about the fiber management spool 242. Excess fiber length is accommodated on the spool 242 by loosely coiling the optical fibers 139 between an inner diameter $D_i$ and an outer diameter $D_o$ of the spool 242. The number of times the optical fibers 139 are each looped about the spool 242 multiplied by the difference between an outer circumference $C_o$ and an inner circumference $C_i$ of the spool 242 is equal to or greater than a difference between the longest routing path P2 and the shortest routing path P1 of the optical fibers 139. The method also includes temporarily parking the connectorized ends of the optical fibers 139 at staging locations on the bottom tray 222 as shown at FIGS. 4 and 9. The method then includes loading the tray assembly 220 into the housing 122 after routing the optical fibers 139 on the bottom tray 222 and temporarily parking the connectorized ends of the connectorized pigtails 218 at the staging locations. After the tray assembly 220 has been loaded into the housing 122, the connectorized ends of the connectorized pigtails 218 are removed from the staging locations (e.g., from the connector holders 248) and plugged into the inner ports 130 of their corresponding fiber optic adapters 126. The fiber length for accommodating moving the connectorized ends of the connectorized pigtails 218 from the staging locations to the inner ports 130 is provided by tightening the coils of the fiber loops about the spool 242. Thus, to access the excess fiber length, it is not necessary to uncoil the optical fibers 139 from the fiber management spool 242. In a preferred example, all of the optical fibers 139 have the same actual length from the starting point to their respective connectorized ends within manufacturing tolerances.

Figure 8:
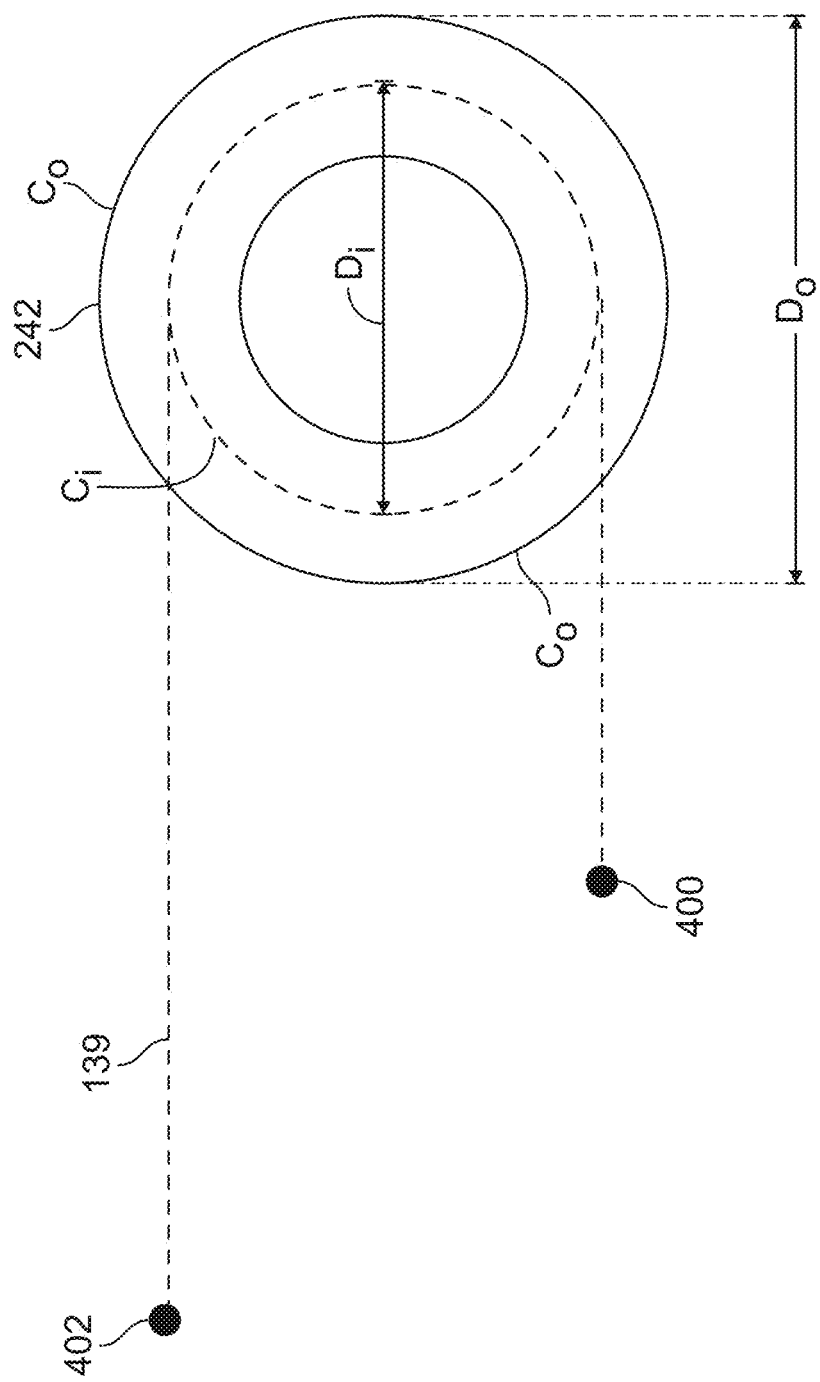
FIG. 8 is a schematic view showing an example routing path that extends about a spool of the bottom tray of the tray assembly of FIG. 2.

FIG. 8 schematically depicts one of the optical fibers 139 routed from a starting location 400 (e.g., the output side of an optical component) to an end location 402 (the inner port of a fiber optic adapter). The optical fiber 139 is shown routed about the fiber management spool 242. The fiber management spool 242 includes an inner diameter $D_i$ and an outer diameter $D_o$. The spool 242 defines an inner circumference $C_i$ corresponding to the inner diameter and an outer circumference $C_o$ corresponding to the outer diameter. As indicated above, it is preferred for all of the connectorized pigtails 218 to have the same length within manufacturing tolerances. To calculate the length of the connectorized pigtails 218, the number of fiber loops required around the fiber management spool 242 is first calculated. The number of fiber loops can be calculated according to the following formula: $L=(F_m-F_s)\div(C_o-C_i)$. In this equation, $F_m$ equals the longest fiber length needed from the start location 400 to an end location 402 with no loops around the inner circumference $C_i$ of the spool 242, and $F_s$ equals the shortest fiber length needed from the start location 400 to an end location 402 with no loops around the inner circumference $C_i$ of the spool 242. In the example described above, $F_m$ equals the length of routing path P2 and $F_s$ equals the length of routing path P1. The value calculated from the above formula is rounded up to the nearest whole number to establish L. It will be appreciated that the calculated number of loops L ensures that the length of optical fiber that can be taken up on the spool by loosely coiling the optical fiber on the spool between the inner diameter and the outer diameter of the spool is sufficiently long to accommodate the difference in length between the longest routing path and the shortest routing path.

The length PL of the connectorized pigtails 218 can be calculated using the following formula: $PL=F_m+(L\times C_i)$. In this formula, PL equals the actual individual length of each of the connectorized pigtails 218, $F_m$ equals the longest fiber routing path between the start location 400 and one of the end locations 402, L equals the calculated number of loops and $C_i$ equals the inner circumference of the spool 242. In certain examples, the pigtail length PL can be further lengthened to compensate for manufacturing tolerances and/or to provide extra slack.

What is claimed is:

1. A telecommunications apparatus comprising:
   an enclosure including a housing;
   a plurality of fiber optic adapters carried with the housing, the fiber optic adapters including outer connector ports accessible from outside the enclosure and inner connector ports inside the enclosure;
   a fiber management tray positioned within the housing, the fiber management tray defining a length extending between first and second opposite ends, the fiber management tray including first and second opposite sides that extend along the length of the fiber management tray between the first and second opposite ends, the fiber management tray including a frame defining a perimeter boundary of the fiber management tray that extends along the first and second opposite sides and around the first and second ends of the fiber management tray, the frame defining a fiber routing path that extends about the perimeter boundary, the fiber management tray including fiber management spools positioned adjacent the second end of the fiber management tray, the fiber management tray including a primarily open region defined between the fiber management spools and the first end of the fiber management tray, the fiber management tray including a plurality of strips that extend between the first and second sides across the primarily open region; and
   a plurality of optical fibers having connectorized ends plugged into the inner connector ports of the fiber optic adapters, the optical fibers being routed about at least one of the fiber management spools.

2. The telecommunications apparatus of claim 1, wherein the optical fibers are all looped an equal number of x turns about one of the fiber management spools.

3. The telecommunications apparatus of claim 2, wherein x equals at least two.

4. The telecommunications apparatus of claim 2, wherein x equals at least three.

5. The telecommunications apparatus of claim 1, wherein the optical fibers include non-connectorized ends that terminate at an optical component mounted on the fiber management tray.

6. The telecommunications apparatus of claim 5, wherein the component includes a fan-out, a passive optical power splitter or a wavelength division multiplexer.

7. The telecommunications apparatus of claim 1, wherein the optical fibers include non-connectorized ends that terminate at one or more optical components.

8. The telecommunications apparatus of claim 7, wherein the one or more optical component is selected from the group including a fan-out, an optical power splitter, a wavelength division multiplexer, and an optical tap.

9. The telecommunications apparatus of claim 1, wherein the housing has a first end and a second end, wherein the fiber management tray mounts in the housing with the first end of the fiber management tray adjacent to the first end of the housing and the second end of the fiber management tray adjacent to the second end of the housing, wherein an input fiber enters the housing through the first end of the housing, wherein the fiber management tray includes a top side and a bottom side, and wherein the frame defines a notch at the bottom side of the fiber management tray at the first end of the fiber management tray for receiving the input fiber.

10. The telecommunications apparatus of claim 9, wherein the fiber management tray is a bottom tray and the telecommunications apparatus includes a top tray adapted to be positioned over the bottom tray.

11. The telecommunications apparatus of claim 10, wherein the top and bottom trays are pivotally connected together at a hinge.

12. The telecommunications apparatus of claim 10, wherein the top and bottom trays have the same perimeter form factors.

13. The telecommunications apparatus of claim 10, wherein the top tray has a smaller perimeter form factor as compared to the bottom tray.

14. The telecommunications apparatus of claim 9, wherein the input fiber is optically coupled to the optical fibers at an optical splice supported at the top tray.

15. The telecommunications apparatus of claim 14, wherein the input optical fiber is spliced to an input fiber of a component including a passive optical power splitter or a wavelength division multiplexer, and wherein the optical fibers are optically coupled to outputs of the component.

16. The telecommunications apparatus of claim 14, wherein the input fiber includes a plurality of input fibers that are optically connected to the optical fibers at the top tray.

17. A telecommunications apparatus comprising:
an enclosure including a housing;
a plurality of fiber optic adapters carried with the housing, the fiber optic adapters including outer connector ports accessible from outside the enclosure and inner connector ports inside the enclosure;
a fiber management tray positioned within the housing, the fiber management tray including a fiber management spool;
a plurality of optical fibers having connectorized ends plugged into the inner connector ports of the fiber optic adapters, the optical fibers each being looped an equal number of times about the fiber management spool, the equal number of times being equal to x, the optical fibers including a first optical fiber having a first routing path that extends from a start location partially around the fiber management spool to a first one of the inner connector ports, the optical fibers including a second optical fiber having a second routing path that extends from the start location partially around the fiber management spool to a second one of the inner connector ports, the first routing path being a shortest routing path and the second routing path being a longest routing path, the optical fibers all having a length from the start location to their corresponding connectorized ends that is longer than a length of the longest routing path.

18. The telecommunications device of claim 17, wherein the telecommunications device includes at least four of the fiber optic adapters and at least four of the optical fibers.

19. The telecommunications device of claim 17, wherein the telecommunications device includes at least eight of the fiber optic adapters and at least eight of the optical fibers.

20. The telecommunications device of claim 17, wherein the telecommunications device includes at least twelve of the fiber optic adapters and at least twelve of the optical fibers.

21. The telecommunications apparatus of claim 17, wherein x equals at least two.

22. The telecommunications apparatus of claim 17, wherein x equals at least three.

23. The telecommunications apparatus of claim 17, wherein all of the optical fibers have the same length from the starting point to their respective connectorized ends within manufacturing tolerances.

24. The telecommunications apparatus of claim 1, wherein a number of times the optical fibers are each looped about the spool multiplied by the difference between an outer circumference and an inner circumference of the spool is equal to or greater than a difference between the longest routing path and the shortest routing path.

25. A method for assembling a telecommunications apparatus including an enclosure having a housing, the telecommunications apparatus also including a plurality of fiber optic adapters carried with the housing, the telecommunications apparatus also including a tray having a fiber management spool, the fiber optic adapters including outer connector ports accessible from outside the enclosure and inner connector ports inside the enclosure, the telecommunications enclosure further including optical fibers routed on the tray having connectorized ends that plug into the inner connector ports of the fiber optic adapters, the optical fibers including a first optical fiber having a first routing path that extends from a start location partially around the fiber management spool to a first one of the inner connector ports, the optical fibers including a second optical fiber having a second routing path that extends from the start location partially around the fiber management spool to a second one of the inner connector ports, the first routing path being a shortest routing path and the second routing path being a longest routing path, the optical fibers all having a length from the start location to their corresponding connectorized ends that is longer than a length of the longest routing path, the method comprising:
routing the plurality of optical fibers on the tray while the tray is outside the housing, the optical fibers each being looped an equal number of times about the fiber management spool, wherein excess fiber length is accommodated on the spool by loosely coiling the fibers between an inner diameter and an outer diameter of the spool, and wherein the number of times the fibers are each looped about the spool multiplied by the difference between an outer circumference and an inner circumference of the spool is equal to or greater than a difference between the longest routing path and the shortest routing path;
temporarily parking the connectorized ends of the optical fibers at staging locations on the tray;
loading the tray into the housing after routing the optical fibers on the tray and temporarily parking the connectorized ends of the optical fibers at the staging locations;
after loading the tray into the housing, removing the connectorized ends from the staging locations and plugging the connectorized ends into their corresponding inner connector ports, wherein fiber length for accommodating moving the connectorized ends to the inner connector ports is provided by tightening the coils of the fiber loops about the spool.

26. The method of claim 25, wherein all of the optical fibers have the same length from the starting point to their respective connectorized ends within manufacturing tolerances.

* * * * *